(12) United States Patent
Hendriks et al.

(10) Patent No.: US 11,932,098 B2
(45) Date of Patent: Mar. 19, 2024

(54) BATTERY ASSEMBLY

(71) Applicant: Volvo Truck Corporation, Gothenburg (SE)

(72) Inventors: Jan Hendriks, Västra Frölunda (SE); Viktor Karlsson, Mölndal (SE)

(73) Assignee: Volvo Truck Corporation, Gothenburg (SE)

( * ) Notice: Subject to any disclaimer, the term of this patent is extended or adjusted under 35 U.S.C. 154(b) by 184 days.

(21) Appl. No.: 17/494,097

(22) Filed: Oct. 5, 2021

(65) Prior Publication Data

US 2022/0111717 A1  Apr. 14, 2022

(30) Foreign Application Priority Data

Oct. 12, 2020 (EP) ..................................... 20201326

(51) Int. Cl.
  *B60K 1/04* (2019.01)
  *B60L 50/60* (2019.01)
  *B60L 50/64* (2019.01)
  *H01M 50/244* (2021.01)

(52) U.S. Cl.
  CPC ................ *B60K 1/04* (2013.01); *B60L 50/64* (2019.02); *B60L 50/66* (2019.02); *H01M 50/244* (2021.01); *B60K 2001/0438* (2013.01); *B60L 2200/36* (2013.01)

(58) Field of Classification Search
  CPC .... B60K 2001/0438; B60K 1/04; B60L 50/64
  See application file for complete search history.

(56) References Cited

U.S. PATENT DOCUMENTS

| 9,108,497 | B2 | 8/2015 | Harrison, III et al. |
| 10,589,788 | B1 | 3/2020 | Milton et al. |
| 11,043,714 | B2* | 6/2021 | Sloan .................. H01M 50/244 |
| 11,124,076 | B1* | 9/2021 | Borghi .................... B60L 50/66 |

(Continued)

FOREIGN PATENT DOCUMENTS

| CN | 104802860 A | 7/2015 |
| CN | 106741185 A | 5/2017 |

(Continued)

OTHER PUBLICATIONS

Extended European Search Report for European Patent Application No. 20201326.4, dated Apr. 1, 2021, 28 pages.

(Continued)

*Primary Examiner* — Brian L Swenson
(74) *Attorney, Agent, or Firm* — Withrow & Terranova, PLLC

(57) ABSTRACT

The present disclosure relates to a battery assembly for a vehicle comprising a pair of longitudinally extending frame rails, the battery assembly comprising a first and a second vehicle battery module, the first vehicle battery module being stacked vertically on top of the second vehicle battery, wherein the battery assembly is configured to be connected to the vehicle vertically below the frame rails by attaching an upper surface of the first vehicle battery module to a horizontally extending portion of a pair of brackets, the pair of brackets being attachable to a respective one of the longitudinally extending frame rails.

12 Claims, 5 Drawing Sheets

(56) References Cited

U.S. PATENT DOCUMENTS

| | | | |
|---|---|---|---|
| 2008/0169139 A1* | 7/2008 | Kramer | B60L 3/003 |
| | | | 903/952 |
| 2012/0312612 A1 | 12/2012 | Harrison, III et al. | |
| 2013/0273398 A1 | 10/2013 | Hoshi et al. | |
| 2017/0305249 A1 | 10/2017 | Hara | |
| 2019/0229314 A1* | 7/2019 | Ribbentrop | B60L 50/66 |
| 2020/0070670 A1 | 3/2020 | Miyoshi | |
| 2020/0259143 A1 | 8/2020 | Sloan et al. | |
| 2021/0188069 A1* | 6/2021 | Friedman | B62D 27/06 |
| 2022/0111716 A1* | 4/2022 | McKibben | B60L 8/003 |
| 2022/0126706 A1* | 4/2022 | Ragot | B60L 50/66 |
| 2022/0169125 A1* | 6/2022 | Borghi | B60L 50/64 |
| 2022/0410686 A1* | 12/2022 | Kumagai | H01M 50/249 |

FOREIGN PATENT DOCUMENTS

| | | |
|---|---|---|
| CN | 206374546 U | 8/2017 |
| CN | 108715129 A | 10/2018 |
| CN | 211125767 U | 7/2020 |
| DE | 102020000491 A1 | 9/2020 |
| EP | 2819208 A1 | 12/2014 |
| JP | 2012240586 A | 12/2012 |
| WO | 2020041630 A1 | 2/2020 |
| WO | 2020074105 A1 | 4/2020 |
| WO | 2020200459 A1 | 10/2020 |

OTHER PUBLICATIONS

First Office Action for Chinese Patent Application No. 202111145635.7, dated Jan. 2, 2024, 14 pages.

* cited by examiner

BATTERY ASSEMBLY

RELATED APPLICATIONS

The present application claims priority to European Patent Application No. 20201326.4, filed on Oct. 12, 2020, and entitled "BATTERY ASSEMBLY," which is incorporated herein by reference in its entirety.

TECHNICAL FIELD

The present disclosure relates to a battery assembly for a vehicle. The present disclosure also relates to a vehicle comprising such a battery assembly. Although the battery assembly will mainly be described in relation to a heavy-duty vehicle, i.e. a truck, it may also be applicable for other types of electrically propelled vehicles comprising longitudinally extending frame rails.

BACKGROUND

The propulsion systems of vehicles are continuously developed to meet the demands from the market. A particular aspect relates to the emission of environmentally harmful exhaust gas. Therefore, vehicles propelled by electric machines have been increasingly popular, both for cars as well as for trucks and other heavy duty vehicles.

In relation to heavy duty vehicles, the battery connected to the electric machine propelling the vehicle needs to be relatively large to be able to deliver a substantial amount of electric power to the electric machine(s), in particular when aiming for covering a long driving range without having to charge the battery.

A conventional placement of the batteries in a heavy duty vehicle is along the longitudinally extending frame rails of the vehicle. This is substantially the same position as used for the fuel tanks of a truck using an internal combustion engine for propulsion. However, positioning the heavy batteries at this position exposes the frame and connecting brackets to high stress, whereby a plurality of brackets is needed to safely suspend the batteries.

SUMMARY

It is an object of the present disclosure to describe a battery assembly which at least partially overcomes the above-described deficiencies.

According to a first aspect, there is provided a battery assembly for a vehicle comprising a pair of longitudinally extending frame rails, the battery assembly comprising a first and a second vehicle battery module, the first vehicle battery module being stacked vertically on top of the second vehicle battery, wherein the battery assembly is configured to be connected to the vehicle vertically below the frame rails by attaching an upper surface of the first vehicle battery module to a horizontally extending portion of a pair of brackets, the pair of brackets being attachable to a respective one of the longitudinally extending frame rails.

The wording "battery module" should be construed as a battery forming part of the assembly and which is configured to, solely or in combination with the remaining battery modules, supply electrical power to an electric machine of the vehicle.

Furthermore, the wording "upper" and "lower" should be understood as seen in a vehicle mounted state. Hence, the upper surface of the first vehicle battery module is the surface facing upwards when being connected to the longitudinally extending frame rails via the brackets. Similarly, the horizontally extending portion of the bracket should be seen as horizontal when the bracket is connected to the frame rails. Also, the definition of the wordings "horizontal" and "vertical" should allow tolerances, i.e. the respective portions need not be perfectly horizontal or vertical when the brackets are connected to the longitudinally extending frame rails.

The present disclosure is based on the insight that by arranging the battery assembly below the frame rails and connecting the first, i.e. the uppermost battery module to both of the frame rails, the load distribution is improved in comparison to connecting each battery assembly transversely outside a respective frame rail.

A further advantage is that the position below the longitudinally extending frame rails is conventionally not provided with any vehicle parts. Thus, improved utilization of vehicle volume is achieved. Also, the battery modules will be arranged at a substantially central position as seen in the transversal direction of the vehicle, which will improve wiring of cables, etc. As compared to a conventional battery package positioned transversally outside the frame rails, the above-described battery assembly enables simpler and more robust connection, such as electrical connections, coolant connections, etc., between the different battery modules.

Moreover, stacking the battery modules on top of each other will enable for the use of a plurality of battery modules, which can increase the overall battery capacity, and thus enable an increased range of operation for the vehicle before re-charging. As will be described further below, the battery modules are preferably arranged as relatively flat battery modules, whereby a plurality of battery modules can be arranged below the longitudinal frame rails.

According to an example embodiment, the upper surface of the first vehicle battery module may be connectable to a downward facing surface of the horizontally extending portion of the brackets. Thus, the first vehicle battery module comprises connectors for attachment/connection to an underside of the bracket.

According to an example embodiment, the second vehicle battery module may be detachably connected to the first vehicle battery module.

According to an example embodiment, the second vehicle battery module may be detachable from the first vehicle battery module while maintaining the first vehicle battery module attached to the horizontally extending portion of the brackets.

The wording "detachably connected" should be construed such that the second vehicle battery module can be disconnected from the first vehicle battery module without disconnecting the first vehicle battery module from the brackets. Hereby, the battery assembly can be disassembled by removing one vehicle battery module at the time, which simplifies maintenance since each vehicle battery module is relatively heavy.

According to an example embodiment, a lower surface of the first vehicle battery module and an upper surface of the second vehicle battery module may comprise a respective connecting portion, wherein the connecting portion of the first vehicle battery module is attached to the connecting portion of the second vehicle battery module. Hereby, an interface for simplified assembly/disassembly is provided.

According to an example embodiment, the first and second vehicle battery modules may comprise a respective vertically extending through-hole, wherein the battery assembly further comprises a fastening element attaching the first and second vehicle battery modules to the horizontally extending portion of the brackets through the through-holes.

Hereby, the complete battery assembly is connected to the brackets via the fastening elements. The fastening elements are preferably arranged in the form of screws or bolts.

According to an example embodiment, a vertical height of the battery assembly may be smaller than a transversal width of the battery assembly. According to an example embodiment, the vertical height may be in the range between 15-25% of the transversal width.

Accordingly, and as indicated above, the battery assembly is formed by a plurality of thin vehicle battery modules. Using thin batteries is advantageous as the number of vehicle battery modules can be increased, which improves the driving range for the vehicle before re-charging.

According to an example embodiment, a transversal width of the first vehicle battery module may be different from the transversal width of the second vehicle battery module. Accordingly, each battery module can be of different size which enable for an improved flexibility as other components of the vehicle can be designed to fit in the vicinity of the battery assembly.

According to an example embodiment, the first and second vehicle battery modules may extend laterally beyond the frame rails when the battery assembly is connected to the vehicle.

An advantage is that relatively wide battery modules can be used. Also, the load distribution is improved as the weight of the battery assembly is distributed to a larger area.

According to an example embodiment, the pair of brackets may form part of the battery assembly.

According to a second aspect, there is provided a vehicle comprising a pair of longitudinally extending frame rails, and a battery assembly comprising a first and a second vehicle battery module for supply of electrical power to electrically controlled components of the vehicle, the first vehicle battery module being stacked vertically on top of the second vehicle battery, and a pair of brackets, each bracket comprising a vertically extending portion attached to one of the frame rails, respectively, and a horizontally extending portion, wherein the battery assembly is connected to the vehicle vertically below the frame rails by attaching an upper surface of the first vehicle battery module to the horizontally extending portion of the brackets.

According to an example embodiment, the first and second vehicle battery modules may extend laterally beyond the frame rails.

Effects and features of the second aspect are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1A:
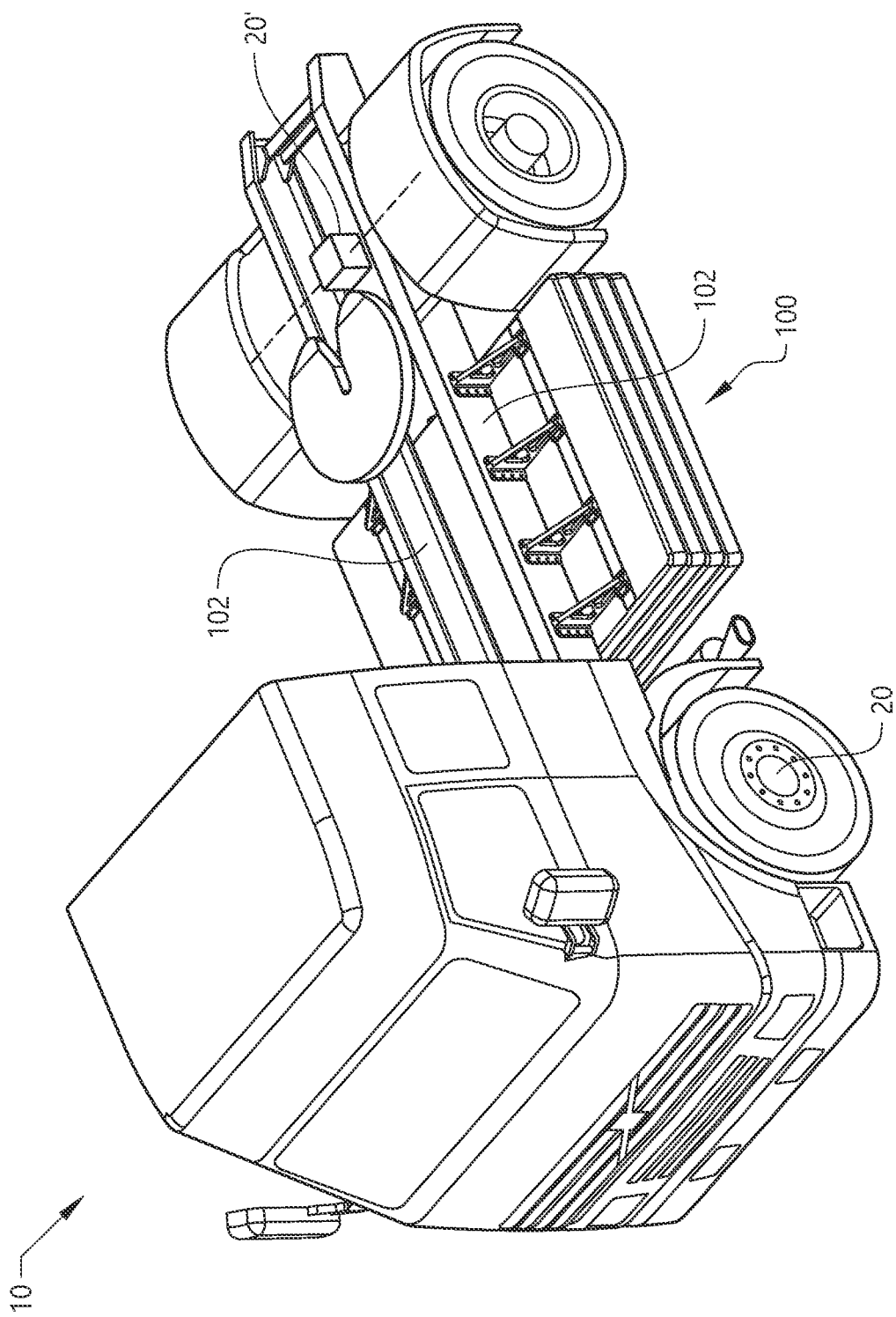
FIG. 1a is a perspective view illustrating a vehicle comprising a battery assembly according to an example embodiment.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1a, there is provided a vehicle 10 in the form of a truck. The vehicle 10 comprises a frame structure composed of two longitudinally extending frame rails 102 and a battery assembly 100 connected to the frame rails 102. The exemplified vehicle 10 is thus operated using at least one prime mover in the form of an electric machine 20, in FIG. 1a depicted as an electric wheel hub motor. The electric machine may however equally as well be a conventional electric motor connected to a wheel axle, such as the illustrated primary drive 20' connected to the rear wheel axle, or to a propeller shaft of the vehicle 10.

Figure 1B:
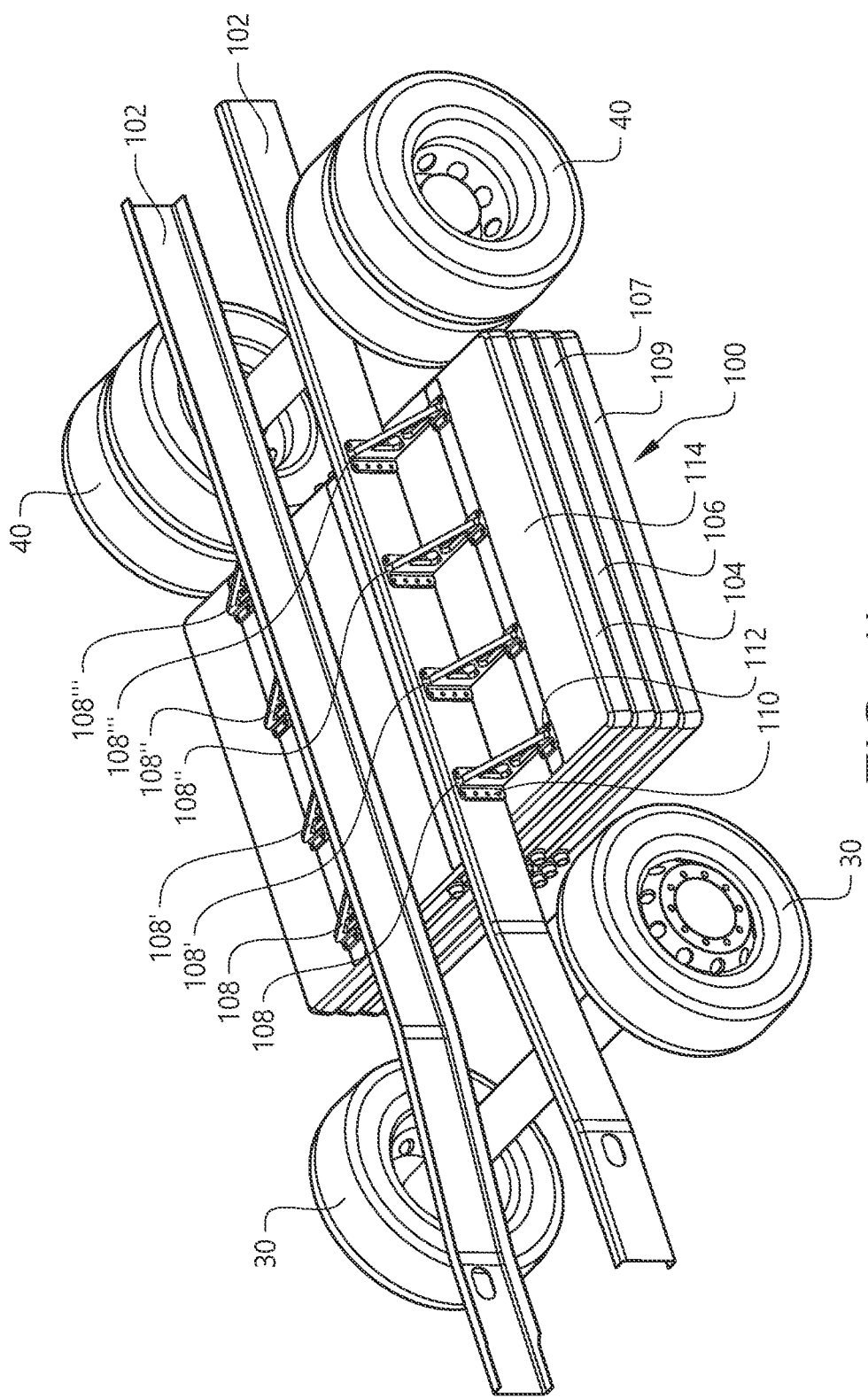
FIG. 1b is a perspective view illustrating the battery assembly in FIG. 1a in further detail according to an example embodiment.

Reference is made to FIG. 1b which illustrates the connection of the battery assembly 10 to the pair of longitudinally extending frame rails 102 in further detail. As can be seen, the battery assembly 100 is connected to the pair of longitudinally extending frame rails 102 between a pair of front wheels 30 and a pair of rear wheels 40. The battery assembly comprises four layers of vehicle battery modules, namely a first 104, a second 106, a third 107 and a fourth 109 battery module. The battery modules 104, 106, 107, 109 are stacked on top of each other, with the first battery module 106 position as the upper most battery module. Example embodiments of the interconnection between the battery modules will be explained in further detail below with reference to FIGS. 3 and 4.

As is further depicted in FIG. 1b, the battery assembly 100 is connected to a plurality of pair of brackets 108, 108', 108", 108"'. In particular, each bracket of the respective pair of brackets is connected to a respective one of the longitudinally extending frame rails 102. According to the exemplified embodiment of FIG. 1b, the battery assembly 100 comprises four pair of brackets 108, 108', 108", 108"'. For simplifying the reading of the present disclosure, only one pair of brackets 108 will in the following be described.

As is depicted, each bracket 108 comprises a vertically extending portion 110 connected to a vertical portion of the frame rail, and a horizontally extending portion 112 connected to the first, uppermost battery module 104. In particular, a downward facing surface 120 (see FIG. 2) is attached to an upper surface 114 of the first battery module 104. The first battery module 104, as well as the remaining battery modules 106, 107, 109 which are stacked to the first battery module 104 are connected to the vehicle vertically below the vertically extending frame rails 102.

Figure 2:
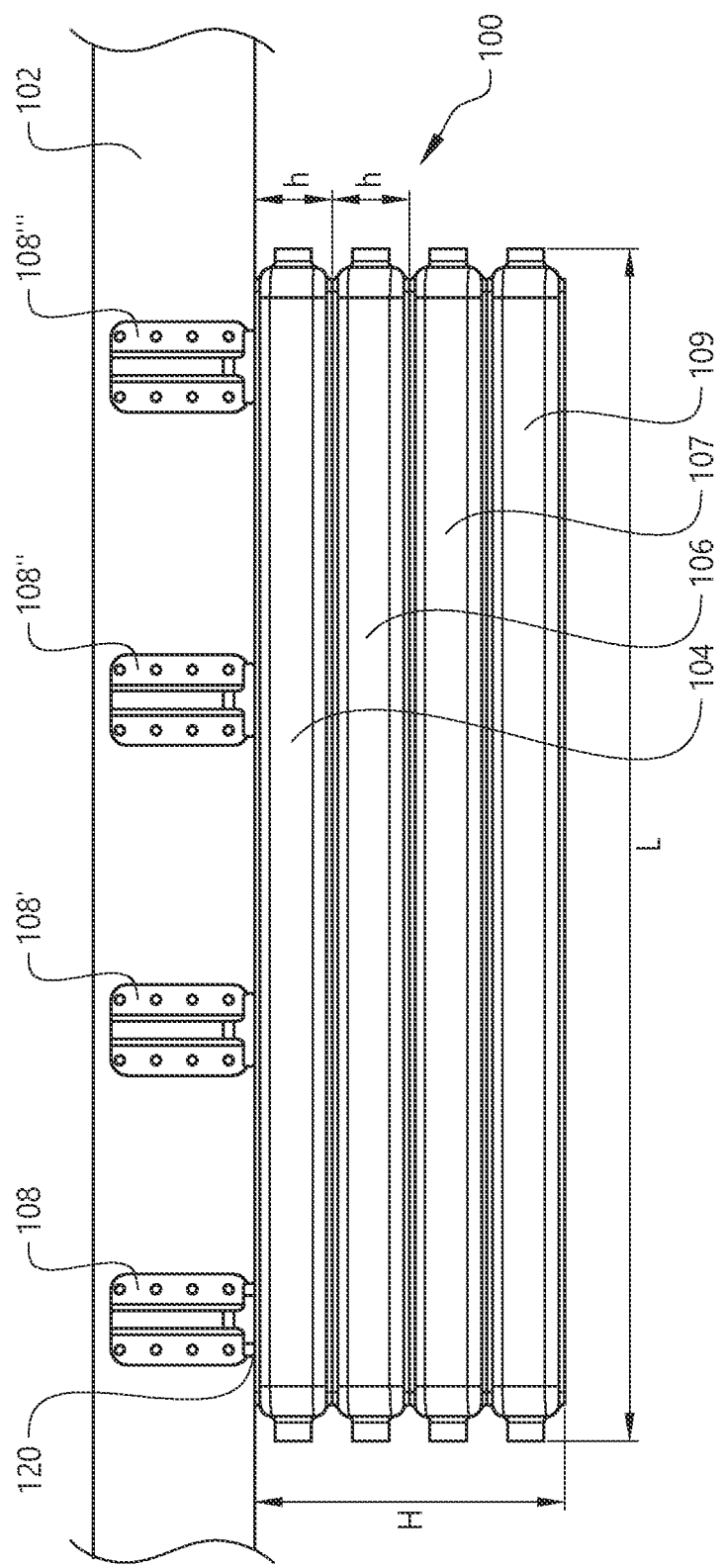
FIG. 2 is a side view of the battery assembly according to an example embodiment.

Turning to FIG. 2 which is a side view of the battery assembly 100 connected to the longitudinally extending frame rails 102 according to an example embodiment. As was described above, the brackets 108 are connected to the vertical surface of the longitudinally extending frame rails 102 and attached to the first battery module 104 by means of the downward facing surface 120. Further, the battery assembly 100 has a height H and a longitudinal length L, while each battery module has a height h. The height H of the battery assembly 100 is thus a multiple of the number of battery modules and the height thereof.

As is evident from the illustration of FIG. 2, the height h of each battery module is substantially smaller than the longitudinal length L, and the battery modules can thus be seen as thin battery modules. The height H of the battery assembly 100 is also substantially smaller than the longitudinal length L. Accordingly, the battery assembly 100 is arranged as a thin battery assembly. The specific length and height dimensions are dependent on the available space at the vehicle provided with the battery assembly.

Figure 3:
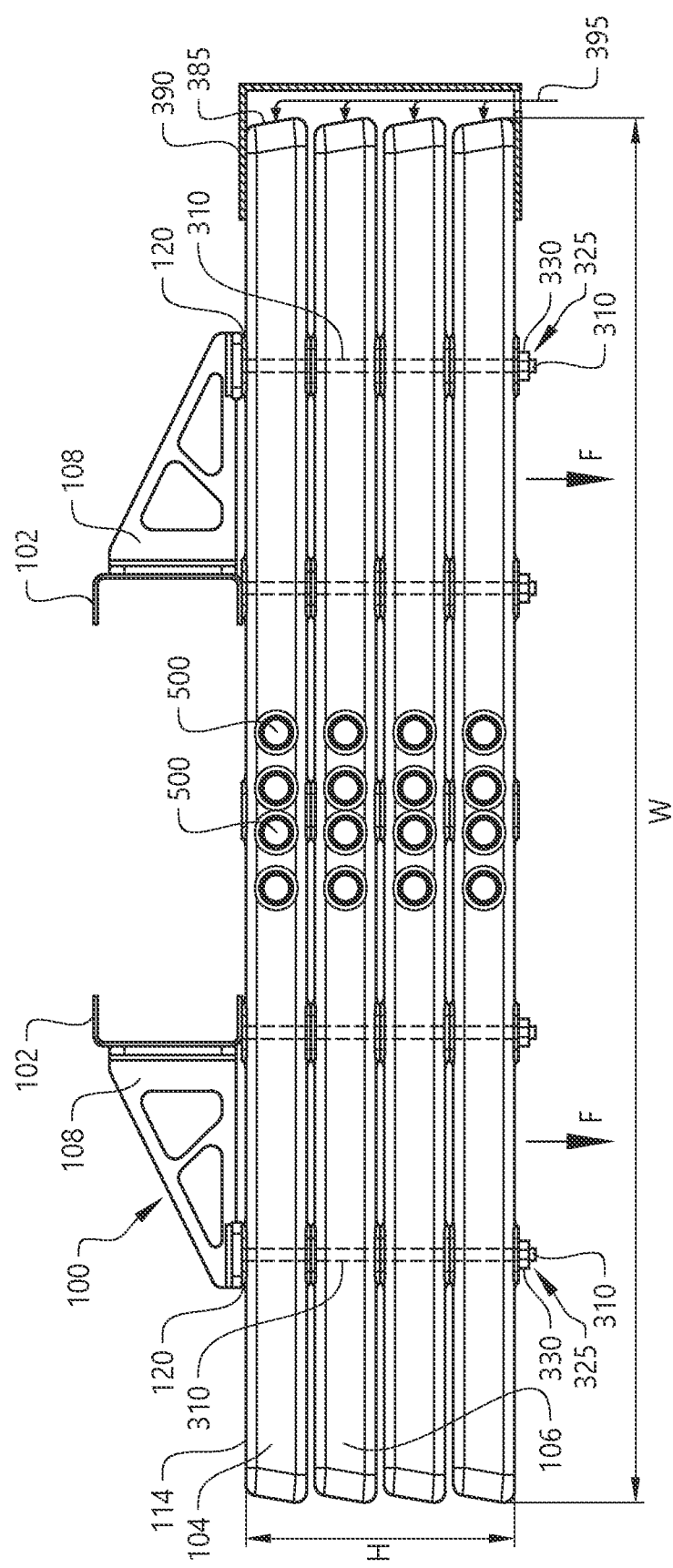
FIG. 3 is a front view of the battery assembly according to an example embodiment.

Turning now to FIG. 3 which is a front view of the battery assembly according to an example embodiment. In a similar vein as described above, the height H of the battery assembly 100 is substantially smaller than a transversal width W of the battery assembly 100. According to a non-limiting example, the height H may be in the range between 15-25% of the transversal width W. Preferably, and as depicted in FIG. 3, the battery assembly 100 extends beyond the laterally beyond the frame rails 102. By means of the attachment of the battery assembly 100 to the longitudinally extending frame rails 102 depicted in FIG. 3, the load distribution F is advantageous, as there are substantially no bending or torsional loads present, merely a load distribution in the form of a vertical force component.

Although not depicted in the figures, the vertical width, as well as the longitudinal length of the respective battery modules may be different from each other. Thus, the first battery module 104 may have a length and width which is different from a length and width of the second battery module 106.

As has been indicated above, the battery modules are connected to the brackets by attaching the first battery module 104 to the bracket. An example embodiment of the interconnection between the battery modules and the brackets 108 is illustrated in FIG. 3. As can be seen by the dashed lines, each battery module comprises vertically extending through-hole 310. A fastening element 325, here in the form of a bolt/screw 320 is arranged in the through-hole 310 from the bracket 108, whereby a nut 330 securely connecting the battery assembly 100 to the brackets 108. Thus, the upper surface 114 of the first battery module 104 is attached to the downward facing side 120 of the brackets 108.

According to another example depicted in FIG. 3, the battery modules may as an alternative, or as a complement, comprise a connecting portion 390 positioned on at least one of the side surfaces 385 of the battery assembly 100. The connecting portion 390 are schematically illustrated in FIG. 3 and interconnects the batter modules to each other. A flow 395 of coolant is arranged into the connecting portion 390 for cooling the battery modules. The connecting portion 390 may also, although not depicted, comprise wire connectors for electrically connecting the battery modules to a power consumer of the vehicle.

As is further depicted in FIG. 3, each battery module comprises wire connectors 500 for electrically connecting the respective battery module to the power consumer (not shown), such as e.g. an electric machine. The wire connectors 500 are centrally positioned as seen in the transversal direction of the battery assembly 100. Hereby, wire pulling to centrally positioned power consumers, or power distributor(s), is simplified compared to e.g. using battery modules connected transversally outside the longitudinally extending frame rails 102, as the wires can be pulled substantially straight not having to e.g. bend the wires, etc.

Figure 4:
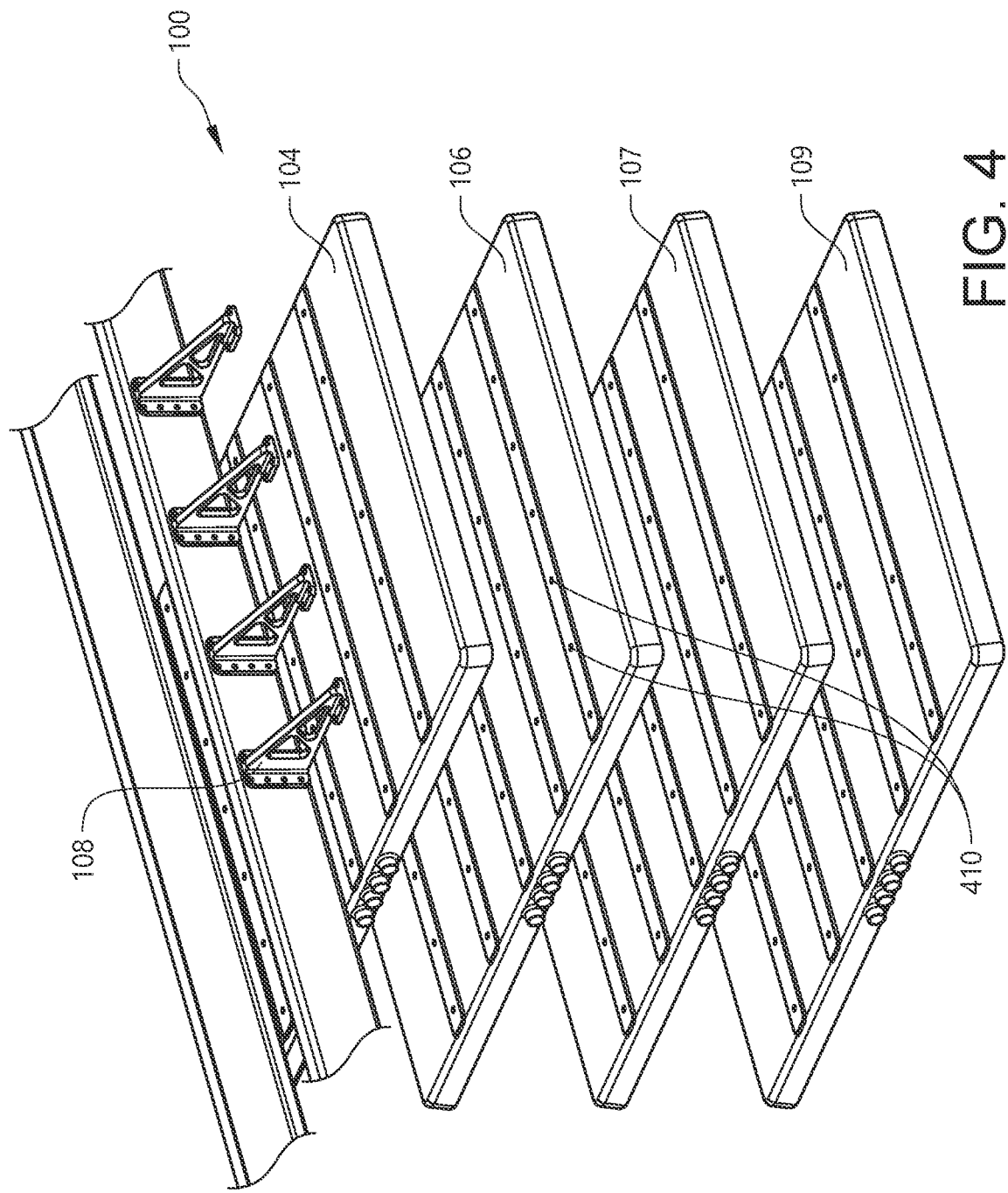
FIG. 4 is an exploded view of the battery assembly according to an example embodiment.

Turning finally to FIG. 4 which is an exploded view of the battery assembly according to an example embodiment. The difference between the embodiment depicted in FIG. 4 and the embodiment in FIG. 3 is primarily that the battery modules in FIG. 4 is not provided with vertically extending through-holes for connection to the brackets 108. Instead, the first battery module 104 is attached to the brackets 108 by individually connecting the first battery module 104 to the brackets using a suitable fastening element such as a screw or a bolt. An interface between the first 104 and second 106 battery modules is also provided, which is illustrated as a connecting portion 410. Hereby, as a first step, the first battery module 104 is connected and attached to the brackets 108. Once the first battery module 104 is securely fastened to the brackets 108, the second battery module 106 is connected and attached to the first battery module 104. A modular assembly process is thus achieved which is advantageous as the weight of the individual battery modules are relatively high. In a similar vein, the second battery module 106 is individually detachable from the first battery module 104, whereby the second battery module 106 can be disconnected from the first battery module 104 while maintaining the first battery module attached to the brackets 108. The connecting portion 410 depicted in FIG. 4 may be arranged as an electrical and coolant connector. Thus, the connecting portion 410 enables for electrical connection between the battery modules, as well as for supply of coolant flow between the battery modules.

It is to be understood that the present disclosure is not limited to the embodiments described above and illustrated in the drawings; rather, the skilled person will recognize that many changes and modifications may be made within the scope of the appended claims. For example, the various dimensions of the fastening element described above can be varied to fit the opening of the mechanical parts it is to retain. The dimensions should also include material- and production tolerances.

The invention claimed is:

1. A battery assembly for a vehicle, comprising:
   a first and a second vehicle battery module, the first vehicle battery module being stacked vertically on top of the second vehicle battery module, wherein the second vehicle battery module is detachably connected to the first vehicle battery module,
   wherein the battery assembly is configured to be connected to the vehicle vertically below a pair of longitudinally extending frame rails of the vehicle by attaching an upper surface of the first vehicle battery module to a horizontally extending portion of a pair of brackets, the pair of brackets being attachable to a respective one of the longitudinally extending frame rails.

2. The battery assembly of claim 1, wherein the upper surface of the first vehicle battery module is connectable to a downward facing surface of the horizontally extending portion of the pair of brackets.

3. The battery assembly of claim 1, wherein the second vehicle battery module is detachable from the first vehicle battery module while remaining attached to the horizontally extending portion of the pair of brackets.

4. The battery assembly of claim 1, wherein a lower surface of the first vehicle battery module and an upper surface of the second vehicle battery module comprise a respective connecting portion, wherein the connecting portion of the first vehicle battery module is attached to the connecting portion of the second vehicle battery module.

5. The battery assembly of claim 1, wherein the first and second vehicle battery modules comprise a respective vertically extending through-hole, wherein the battery assembly further comprises a fastening element configured to attach the first and second vehicle battery modules to the horizontally extending portion of the pair of brackets through the through-holes.

6. The battery assembly of claim 1, wherein a vertical height of the battery assembly is smaller than a transversal width of the battery assembly.

7. The battery assembly of claim 6, wherein the vertical height is in the range between 15-25% of the transversal width.

8. The battery assembly of claim 1, wherein a transversal width of the first vehicle battery module is different from a transversal length of the second vehicle battery module.

9. The battery assembly of claim 1, wherein the first and second vehicle battery modules extend laterally beyond the frame rails when the battery assembly is connected to the vehicle.

10. The battery assembly of claim 1, wherein the pair of brackets forms part of the battery assembly.

11. A vehicle, comprising:
a pair of longitudinally extending frame rails, and
a battery assembly comprising a first and a second vehicle battery module for supply of electrical power to electrically controlled components of the vehicle, the first vehicle battery module being stacked vertically on top of the second vehicle battery module, wherein the second vehicle battery module is detachably connected to the first vehicle battery module, and a pair of brackets, each bracket comprising a vertically extending portion attached to one of the frame rails, respectively, and a horizontally extending portion,
wherein the battery assembly is connected to the vehicle vertically below the frame rails by attaching an upper surface of the first vehicle battery module to the horizontally extending portion of the pair of brackets.

12. The vehicle of claim 11, wherein the first and second vehicle battery modules extend laterally beyond the frame rails.

* * * * *